United States Patent
Lee et al.

(10) Patent No.: US 8,916,210 B2
(45) Date of Patent: Dec. 23, 2014

(54) EXTRACTOR HAVING POTTERY WITH A DARK BROWN GLAZE AND THE METHOD FOR EXTRACTING USING THEREOF

(75) Inventors: Jin Young Lee, Gyeonggi-do (KR); Jun Seong Park, Gyeonggi-do (KR); Eun Joo Kim, Gyeonggi-do (KR); Hye Yoon Park, Gyeonggi-do (KR); Sung Il Park, Seoul (KR); Youn Joon Kim, Seoul (KR); Duck Hee Kim, Seoul (KR); Ih Seop Chang, Gyeonggi-do (KR); Sun Young Kim, Seoul (KR); Hyun Soo Jo, Gyeonggi-do (KR)

(73) Assignee: Amorepacific Corporation, Seoul (KR)

( * ) Notice: Subject to any disclaimer, the term of this patent is extended or adjusted under 35 U.S.C. 154(b) by 675 days.

(21) Appl. No.: 12/744,600

(22) PCT Filed: Feb. 18, 2008

(86) PCT No.: PCT/KR2008/000935
§ 371 (c)(1),
(2), (4) Date: Jul. 7, 2010

(87) PCT Pub. No.: WO2009/069856
PCT Pub. Date: Jun. 4, 2009

(65) Prior Publication Data
US 2010/0291243 A1 Nov. 18, 2010

(30) Foreign Application Priority Data
Nov. 27, 2007 (KR) .......................... 10-2007-0121572

(51) Int. Cl.
*A61K 36/00* (2006.01)
*A21B 1/02* (2006.01)
*B01J 19/00* (2006.01)
*A47J 31/32* (2006.01)

(52) U.S. Cl.
CPC ........................................ *A47J 31/32* (2013.01)
USPC .......................... 424/725; 422/138; 435/286.6

(58) Field of Classification Search
None
See application file for complete search history.

(56) References Cited

U.S. PATENT DOCUMENTS

2004/0147767 A1* 7/2004 Whittle et al. ................ 549/390

FOREIGN PATENT DOCUMENTS

| KR | 10-1998-0000296 | | 3/1998 |
|---|---|---|---|
| KR | 19980000296 A | * | 3/1998 |
| KR | 10-1999-0040316 | | 6/1999 |
| KR | 10-2002-0068005 | | 8/2002 |
| KR | 10-2005-0016800 | | 2/2005 |

OTHER PUBLICATIONS

International Search Report for PCT/KR2008/000935, mailed Aug. 21, 2008.
Written Opinion of the International Searching Authority for PCT/KR2008/000935, mailed Aug. 21, 2008.

* cited by examiner

*Primary Examiner* — Chris R Tate
*Assistant Examiner* — Russell Fiebig
(74) *Attorney, Agent, or Firm* — Nixon & Vanderhye P.C.

(57) ABSTRACT

Disclosed are an extractor having a "pottery with dark brown glaze" called "Onggi" in Korean, and a method of extracting using the same. The extractor includes a body, a body cover, a heating part, a pottery and a gas valve. The pottery is located within the body. The extractor extracts by injecting nitrogen gas, etc. into the body through a gas valve, thereby rendering the inside of the body to be high pressure state during extraction. Thus, the inside of the body is maintained under high pressure during extraction. Accordingly, an extract is located only within the pottery, and thus changes that can be caused while an extract contacts with the body can be prevented.

2 Claims, 5 Drawing Sheets

EXTRACTOR HAVING POTTERY WITH A DARK BROWN GLAZE AND THE METHOD FOR EXTRACTING USING THEREOF

This application is the U.S. national phase of International Application No. PCT/KR2008/000935 filed 18 Feb. 2008, which designated the U.S. and claims priority to Korean Application No. 10-2007-0121572 filed 27 Nov. 2007, the entire contents of each of which are hereby incorporated by reference.

TECHNICAL FIELD

The present invention relates to an extractor having a "pottery with a dark brown glaze" called "Onggi" in Korean (hereinafter, referred to "pottery" simply), and a method of extracting using the same. More particularly, the present invention relates to an extractor having a pottery which renders the body to be high pressure state by injecting nitrogen gas, etc. into the body so that an extract is located only within the pottery during extraction, and a method of extracting using the same.

BACKGROUND ART

An extractor refers to an apparatus that contacts a liquid or a solid mixture with a solvent thereby being subjected to extraction. Such an extractor can be used in various arts, and particularly used in decocting an oriental medicine called Hanyak in oriental medical science. In the past, the extractor used in home was small in size. However, as extraction in large amounts increased in recent years, the extractor to be used also became large in size. A large extractor is made of a metal such as stainless steel.

It is important for an extractor that extraction should be achieved without deteriorating the extract, e.g., chemical change. Particularly, if an extractor made of a stone or a metal is used for decocting oriental medicine, the extractor has some problems in that it causes sedimentation in an extract, decreases the solubility of the extract, and causes chemical change in the extract, thereby generating side effects. Accordingly, the extractor made of stainless steel has a problem in that its quality is deteriorated.

DISCLOSURE

Technical Problem

Accordingly, the objects of the present invention are to provide an extractor that an extract is prevented from contacting with a metal body during extraction, and a method of extracting using the same.

Technical Solution

In order to achieve the above objects, an extractor according to an embodiment of the present invention includes a body, a body cover, a heating part, a pottery and a gas valve. The inside of the body is hollow, and the body is made of a metal. The body cover seals the body. The heating part heats the body at the outside of the body. The pottery is located within the body. Through a gas valve, a gas is injected into the body, or a gas within the body is discharged. In other embodiments, the number of the gas valves may be two. A first gas valve is to inject a gas, and a second gas valve is to discharge a gas.

An extractor according to an embodiment of the present invention can include a pottery cover. The pottery cover is located at upper part of the pottery to seal the pottery. The pottery cover may have Oring at sides thereof.

A gas injected or discharged through a gas valve is nitrogen in an extractor according to an embodiment of the present. In other embodiment, the gas may be an inert gas such as argon (Ar) or helium (He).

A method of extracting according to an embodiment of the present invention comprises putting subject material to be extracted and an extracting solvent into the pottery; sealing the body; discharging air within the body by injecting a gas into the body; injecting a gas until the inside of the body reaches predetermined pressure; extracting by heating the body; cooling the body; and discharging the injected gas.

In the method of extracting according to an embodiment of the present invention, the step of putting subject material to be extracted and an extracting solvent into the pottery further comprises closing with the pottery cover to seal the pottery.

Advantageous Effects

According to the present invention, an extract does not contact with a metal body during extraction since the inside of the body within the extractor in which a pottery is located is maintained at high pressure. Thus, the extract is prevented from being deteriorated.

In addition, highly volatile ingredients can be prevented from being volatized by controlling the pressure within the body during extraction.

DESCRIPTION OF DRAWING REFERENCE NUMBERS

| | |
|---|---|
| 100, 200: extractor | 110, 210: body |
| 120, 220: body cover | 130, 230: heating part |
| 140, 240: pottery | |
| 150, 151, 250, 251: gas valve | |
| 260: pottery cover | |

BEST MODE

Hereinafter, preferred embodiments of the present invention will be described with reference to attached drawings in detail so that those skilled in the art can embody the present invention easily.

In describing those embodiments, description will be omitted for techniques that are well known to the art to which the present invention pertains, and are not directly related to the present invention. This intends to disclose the gist of the present invention more clearly by omitting unnecessary description.

In the same reason, some constitution components are exaggerated, omitted or schematically shown in the attached drawings. Further, the size of respective components does not reflect entirely the actual size. The same drawing reference number is given to the same or corresponding components in drawings.

Embodiment 1

Figure 1:
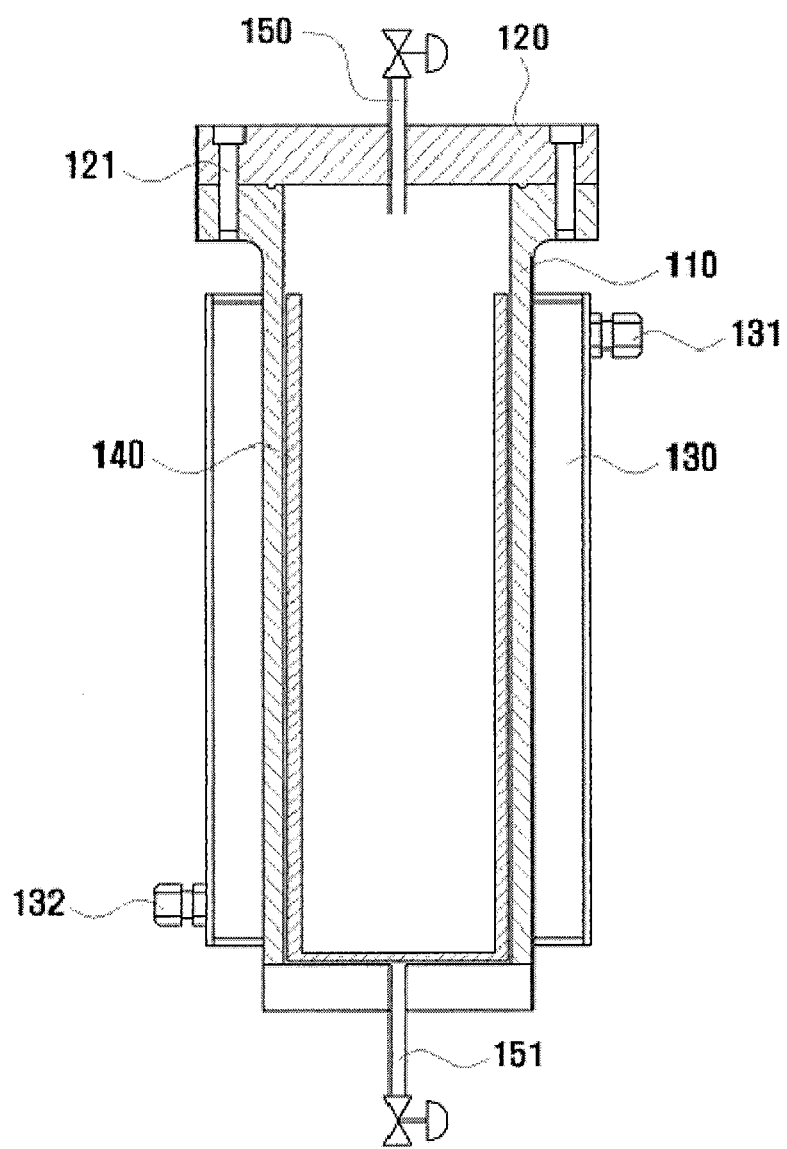
FIG. 1 illustrates an extractor according to an embodiment of the present invention.

FIG. 1 illustrates an extractor according to an embodiment of the present invention.

As shown in FIG. 1, an extractor 100 according to an embodiment of the present invention includes a body 110, a body cover 120, a heating part 130, a pottery 140, and gas valves 150, 151. In the embodiment, the body 110 has cylindrical shape; however, other shapes are also allowable. Top of the body 110 is open and its inside is hollow. The body 110 is made of a metal such as stainless steel.

A body cover 120 is located on the open top of the body 110. The body cover 120 can be fixed to the body 110 by a cover fixing part 121. Since the inside of the body 110 is in high pressure state during extraction, the body cover 120 can be separated from the body 110. If the inner pressure of the body 110 is very high, the body cover 120 can be popped around, and thus that may be dangerous. Accordingly, the body cover 120 must be firmly tightened with the cover fixing part 121.

The heating part 130 heats the body 110 at its outside. In this embodiment the heating part 130 wraps around the body 110; however, in other embodiment the heating part 130 can be located beneath the body 110. The heating part 130 may include a first valve 131 and a second valve 132. If the body 110 is tried to heat, water in high temperature is supplied to the heating part 130 through the first valve 131. Since the heating part 130 wraps around the body 110, the inside temperature of the body 110 rises when water in high temperature is supplied to the heating part 130. When extraction is completed, water in high temperature is discharged from the inside of the heating part 130 through the second valve 132. If quick cooling is desired, cold water can be supplied to the inside of the heating part 130 through the first valve 131.

The pottery 140 is located within the body 110. Subject material to be extracted and an extracting solvent are put into the pottery 140. The pottery is made of loess. The main ingredients of loess are silica ($SiO_2$), alumina ($Al_2O_3$), iron, magnesium (Mg), sodium (Na), etc. Loess contains clay. Thus, loess has properties that it has viscous power and thus it is not easily broken, and it is changed again into clay when water is added. The pottery 140 made of loess contains innumerable micropores, and when it is heated, far infrared rays required in growth of an animal or a plant are discharged in much quantity thereby stimulating molecular activity of other material. In addition, the pottery 140 made of loess can breathe through micropores. Accordingly, the pottery 140 can remove the toxicity of a food through detoxification, and force a harmful ingredient out, thereby preserving material within the pottery for a long period. Therefore, when material such as Hanyak is extracted using the pottery 140, excellent extraction effect and pharmacological effect are ensured since the pottery 140 discharges far infrared rays.

The gas valves 150, 151 are used in injecting a gas into the body 110, or discharging a gas within the inside of the body 110. In this embodiment, the number of the gas valves 150, 151 are two; however, in other embodiment, the number of the gas valve may be one or plural. The first gas valve 150 intends to inject a gas into the body 110. In the embodiment, the first gas valve 150 is located, but is not limited to, at the body cover 120. The second gas valve 151 intends to discharge a gas within the body 110. In the embodiment, the second gas valve 151 is located, but is not limited to, at the lower part of the body 110.

Figure 2:
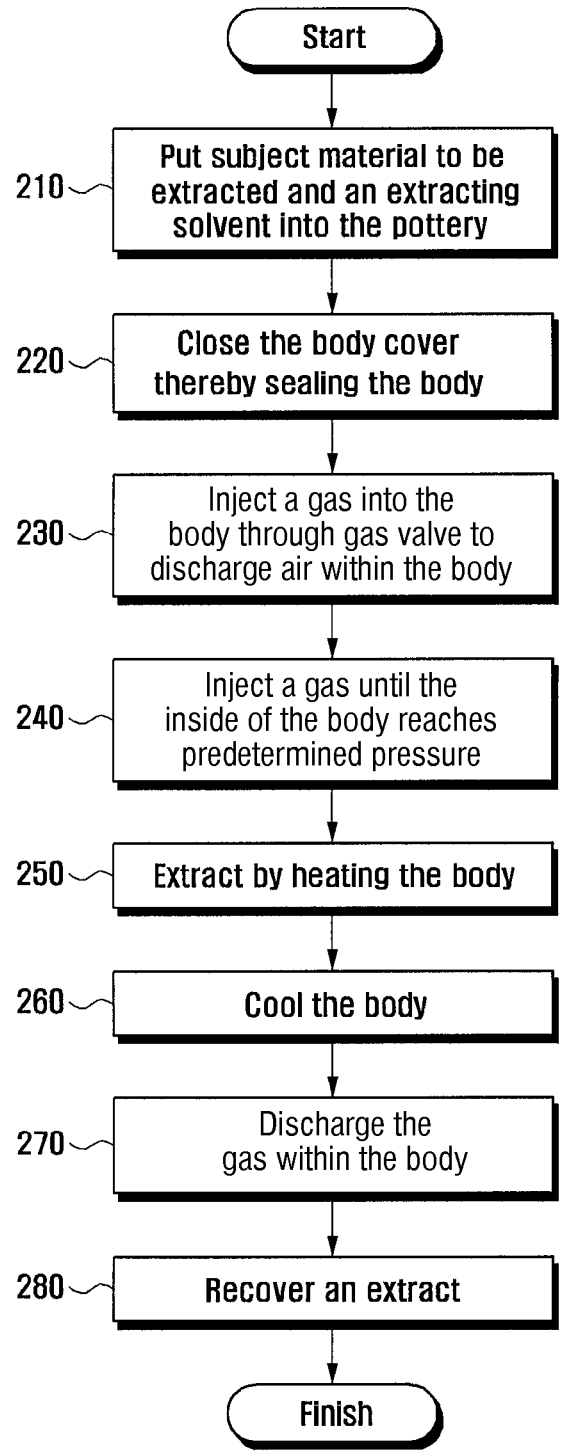
FIG. 2 illustrates a flow chart showing a method of extracting according to an embodiment of the present invention.

FIG. 2 illustrates a flow chart showing a method of extracting according to an embodiment of the present invention.

As shown in FIG. 2, subject material to be extracted and an extracting solvent in a certain ratio are put into a pottery located within the body (210). In the embodiment, the subject material to be extracted is a natural drug such as a kind of milk vetch, licorice, etc., and the extracting solvent is water. After the subject material to be extracted and the extracting solvent are put into the pottery, the body cover of the extractor is closed thereby sealing the body (220).

When the body is sealed, a gas is injected into the body through a gas valve, thereby discharging air of the inside of the body (230). At this time, gases injected into the body can be nitrogen. Nitrogen is a very stable gas, and thus its explosiveness or dangerousness is low. Accordingly, even the inside of the body is under high temperature and high pressure, it is safe. In other embodiment, inert gas such as argon (Ar) or helium (He) can be also used. The inert gas is a gas that even it is compressed to high concentration state, it is not easily exploded or deteriorated, and thus it is highly stable. Accordingly, even the inside of the body is under high temperature and high pressure, it is safe.

When air is discharged from the inside of the body, gas is injected into the body until the inside of the body reaches predetermined pressure (240). The predetermined pressure is a value that a user can determine. The body is designed and manufactured so that its inner pressure can be maintained at 1 to 350 atm. In the embodiment, the predetermined pressure is set to 10 atm, and thus the inside of the body becomes high pressure state. If the inside of the body becomes high pressure state, its boiling point rises. Accordingly, it is prevented that the extract is boiled during extraction, and thus it contacts with the body which is a metal.

When the inside of the body reaches desired pressure, the body is heated and extracted (250). The heating of the body can be achieved by supplying water in high temperature to the heating part. After extraction is completed, the body is cooled by discharging water in high temperature from the heating part (260). When cooling the body quickly, cold water can be supplied to the heating part. When the body is cooled, a gas is discharged from the inside of the body (270). After the gas is discharged, the body cover is opened and the extract is recovered (280).

Embodiment 2

Figure 3:
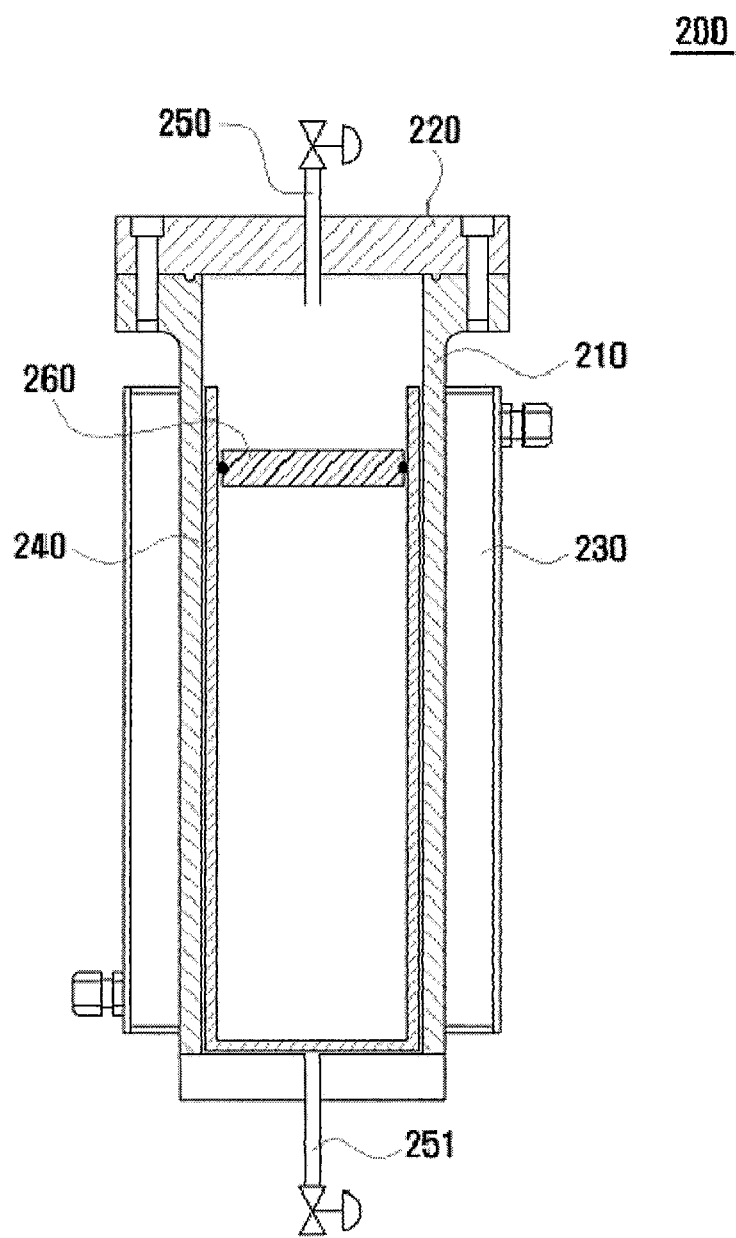
FIG. 3 illustrates an extractor according to another embodiment of the present invention.

FIG. 3 illustrates an extractor according to another embodiment of the present invention.

As shown in FIG. 3, an extractor 200 according to another embodiment of the present invention includes a body 210, a body cover 220, a heating part 230, a pottery 240, gas valves 250, 251, and a pottery cover 260. The body 210, the body cover 220, the heating part 230, the pottery 240, and the gas valves 250, 251 are the same as described in the Embodiment 1, and thus description thereabout is omitted.

The pottery cover 260 is located at upper part of the pottery 240. In the embodiment, the pottery cover 260 has, but is not limited to, round shape. The pottery cover 260 is used in order to seal the pottery 240. Since an extract within the pottery cannot contact with the body if the pottery is sealed, the extract can be prevented from being deteriorated. For the pottery cover 260 to seal the pottery 240, the diameter of the pottery cover 260 should be matched with that of the pottery 240.

Figure 4:
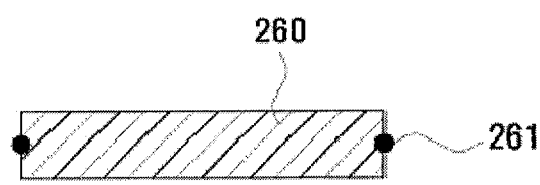
FIG. 4 illustrates a sectional view showing a section of the pottery cover according to another embodiment of the present invention.

FIG. 4 illustrates a sectional view showing a section of the pottery cover according to another embodiment of the present invention.

As shown in FIG. 4, the pottery cover 260 has grooves at sides. In the groove, an Oring 261 can be located. The Oring 261 is a round ring used for preventing a liquid such as water from being leaked. The Oring 261 is made of a natural rubber, a synthetic rubber or a synthetic resin, etc. The Oring 261 of the pottery cover 260 can be subjected to TEFLON™ coating. TEFLON has properties such as high heat resistance, excellent insulating stability and low friction coefficient, etc. since it forms very stable compound due to strong chemical binding between fluorine and carbon. The pottery 240 can be sealed more definitely since the pottery cover 260 includes the Oring 261.

Figure 5:
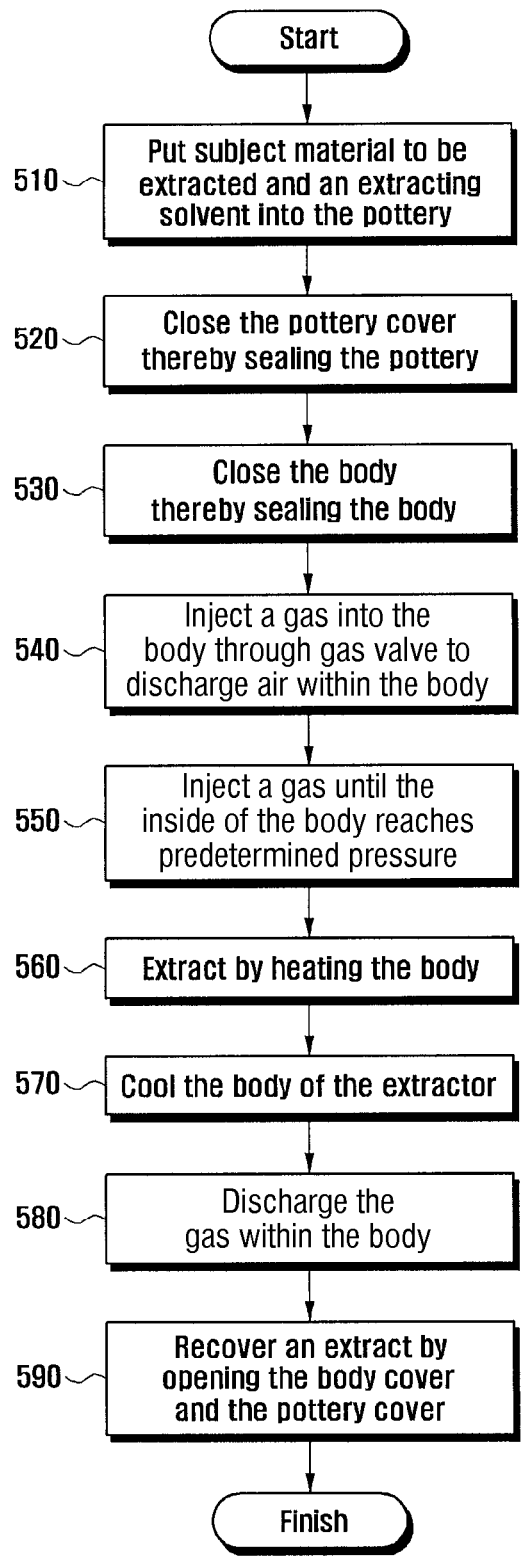
FIG. 5 illustrates a flow chart showing a method of extracting according to another embodiment of the present invention.

FIG. 5 illustrates a flow chart showing a method of extracting according to another embodiment of the present invention.

As shown in FIG. 5 1 subject material to be extracted and an extracting solvent are put into a pottery in a certain ratio (510). In the embodiment, the subject material to be extracted is a natural drug such as a kind of milk vetch [licorice, etc., and the extracting solvent is water. After the material to be extracted and the extracting solvent are put into the pottery, the pottery cover is closed thereby sealing the pottery (520). After the pottery is sealed, the body cover of the extractor is closed thereby sealing the body (530). When the body is sealed, a gas is injected into the body through a gas valve, thereby discharging air of the inside of the body (540). At this time, a gas injected into the body can be an inert gas such as nitrogen, argon (Ar) or helium {He). After air is discharged from the inside of the body, a gas is injected into the body until the inside of the body reaches predetermined pressure (550). When the inside of the body reaches desired pressure, the body is heated and extracted (560). At this time, if the pressure of the inside of the pottery increases, the cover of the pottery ascends, and if the pressure is in equilibrium with that of the inside of the body, the ascending of the cover is stopped.

After extraction is completed, the body is cooled by discharging water in high temperature from the heating part (570). When the body is cooled, a gas is discharged from the inside of the body (580). After gas 270 is discharged, the body cover and the pottery cover are opened and the extract is recovered (590).

INDUSTRIAL APPLICABILITY

As described above, the specification and the drawings disclosed the preferred embodiments of the present invention. Although specific terms were used, those were used in general meanings to describe the technical content of the present invention easily and help understanding the present invention, and accordingly the scope of the present invention is not limited to those terms. It will be apparent to those skilled in the art that the present invention can be embodied into various other embodiments based on the technical ideas of the present invention in addition to the embodiments disclosed herein.

The invention claimed is:

1. An extractor apparatus for producing an extract from a material without causing a chemical change in the extract, the apparatus comprising:
    a metal body defining a cavity;
    a body cover located on top of the body for sealing the body;
    a heating part for heating the cavity from the outside of the body;
    a pottery, wherein the pottery is sized and positioned in the body cavity such that the material to be extracted and an extraction solvent can be positioned in the pottery without contacting the metal body;
    a pottery cover, located at the upper part of the pottery, wherein the pottery cover has an O-ring at the sides thereof and wherein the pottery cover seals the pottery to prevent entry of the gas into the pottery; and
    a first gas valve for injecting gas and a second gas valve for discharging the gas.

2. The apparatus according to claim 1, wherein the gas injected or discharged through the gas valve is selected from the group consisting of nitrogen, argon and helium.

* * * * *